Dec. 18, 1928.
C. C. PALMER
1,695,292
METHOD OF REFRIGERATION AND APPARATUS THEREFOR
Filed Aug. 23, 1927
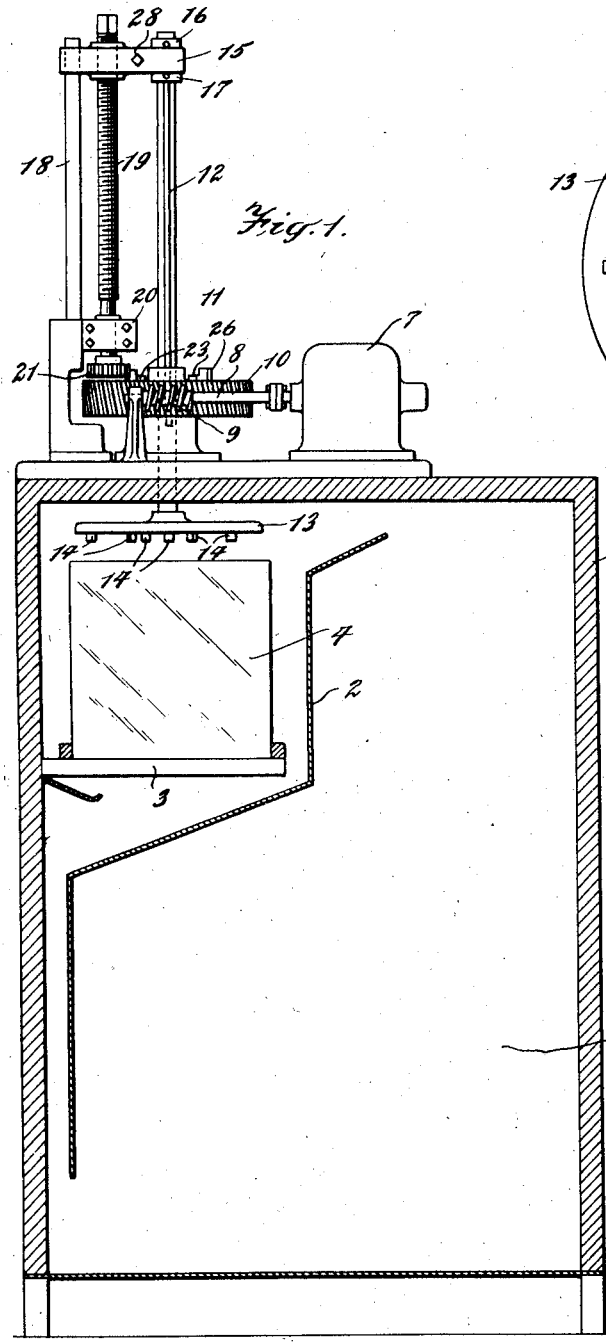
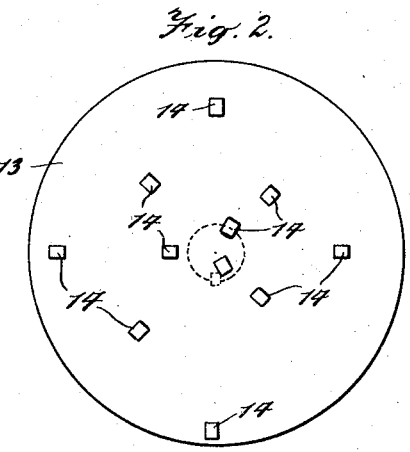
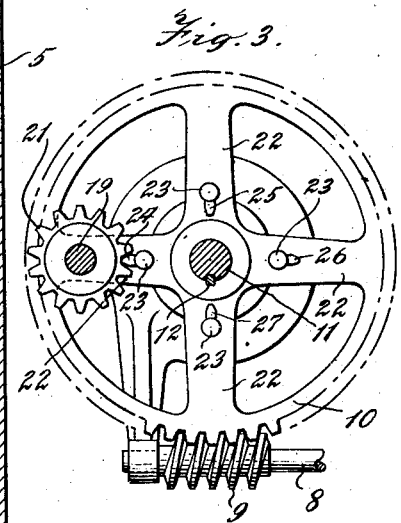
INVENTOR.
Cassius C. Palmer
BY
Gifford & Scull ATTORNEYS.

Patented Dec. 18, 1928.

1,695,292

UNITED STATES PATENT OFFICE.

CASSIUS C. PALMER, OF NEW YORK, N. Y.

METHOD OF REFRIGERATION AND APPARATUS THEREFOR.

Application filed August 23, 1927. Serial No. 214,825.

My invention relates to method of refrigeration and apparatus therefor and is particularly useful in connection with congealed or solid $CO_2$. The congealed $CO_2$ as now manufactured is a hard non-porous substance similar in appearance to water ice, but has many qualities superior to those of water ice. Pound for pound it absorbs about twice the amount of British thermal units as water ice when melted in the same manner and in approximately the same time. It produces a temperature of approximately minus 40° F. in a storage space of a refrigerator where water ice would produce approximately plus 40° F. under the same conditions.

Broadly stated, my method consists of the application of congealed $CO_2$ to one side of a member of good heat conductivity and exposing the other side of the member to the space to be cooled. In its practical form I shave particles from a block of $CO_2$ and distribute them over one face of a metal plate, the other side of which plate is exposed to the chamber to be cooled. By this method the heat in the space to be cooled is much more rapidly absorbed by the $CO_2$ than is the case when the $CO_2$ is used in cakes or blocks in the ordinary manner. By varying the amount of shavings removed from the block within a given period of time the refrigeration of the chamber may be controlled as desired.

I will now describe an apparatus which may be used successfully in the carrying out of my method. This apparatus is illustrated in the attached drawings, in which—

Fig. 1 is a front elevation;

Fig. 2 is a plan view of the cutter; and

Fig. 3 is a view on an enlarged scale of the mechanism for operating the cutter.

Referring to the drawings, the chamber 1 to be cooled has a metal plate 2 placed therein and a support 3 carries a block 4 of $CO_2$. The chamber 1 is defined by a container 5 on the top of which is mounted the means for shaving $CO_2$. This means comprises a motor 7 connected to a shaft 8 upon which is placed a worm 9 which engages a worm wheel 10 slidably mounted on a shaft 11. The worm wheel 10 is rotatably fixed to the shaft by a key 12. The lower end of the shaft 11 passes through the container 5 and carries a cutter head 13 upon which are mounted a plurality of cutters 14. The cutters 14 are so distributed over the surface of the cutter 13 as to cut the $CO_2$ uniformly through its area, as will be seen in Fig. 2. The upper end of the shaft 11 is supported by an arm 15 in which the shaft rotates. The arm 15 is fixed longitudinally of the shaft 11 by collars 16 and 17. A guide 18 engages the end of the arm 15 opposite to the shaft 11. A screw 19 is threaded into the arm between the shaft 11 and the guide 18. The screw 19 is supported near its lower end by an arm 20 and carries on its lower end a gear 21. The worm wheel 10 has four spokes 22. Mounted on each spoke is a boss 23. Each boss 23 carries a pivoted member 24, 25, 26 or 27. These members when in one position engage the gear 21 and when in the other position they are free of that gear. For instance, in referring to Fig. 3, the members 24 and 26 are in the position to engage the gear 21, whereas the members 25 and 27 are out of the path of the gear. Upon engagement of the gear 21 by the member 24 the gear is rotated one tooth. This in turn rotates the screw 19 in a direction to move the shaft 11 downwardly toward the block 4 of $CO_2$. If it is desired to increase the speed of cutting the member 26 may be thrown to the position shown whereupon the gear 22 will be rotated two teeth for each rotation of the shaft 11. If the member 25 is thrown to the position for engaging the gear, the gear 21 will be rotated three teeth for each rotation of the shaft 11, and if the member 27 were thrown to engage the gear, gear 21 will be rotated four teeth of the shaft 11. By adjusting the members 24 to 27 the rate of cutting may be adjusted as desired.

The shavings which are cut from the block 4 fall upon the sheet 2 and because of the large surface exposed by the other side of the sheet 2 the chamber 1 is greatly reduced in temperature.

The arm 15 is split and held together by bolt 28, so that when the cutter head 13 has moved down to use up substantially all of the block 4, the bolt 28 may be loosened and the shaft 11 together with the arm 15 may be quickly moved to the position shown in Fig. 1 where the device is ready to again begin its cutting operation.

From the foregoing it will be evident that my invention has many advantages which will be apparent to those skilled in the art.

I claim:

1. The process which consists in shaving off portions of a cake of $CO_2$, depositing the shavings on a metal sheet and exposing the opposite side of the sheet to a chamber to be cooled.

2. The method of refrigeration which consists in dividing a block of congealed $CO_2$ into chips, spreading the chips over a metal sheet and exposing the other side of said sheet to the chamber to be cooled.

3. The method of refrigeration which consists in shaving particles off of a cake of congealed $CO_2$ and spreading the shavings on one face of a metal sheet and exposing the other face of said sheet to the chamber to be cooled.

4. In refrigeration apparatus, the combination of a chamber to be cooled, a support in said chamber for a block of congealed $CO_2$ or the like, means for removing small pieces of said block and a metal sheet between said block and the main portion of said chamber upon which said pieces are spread after removal from said block.

5. In refrigeration apparatus, the combination of a chamber to be cooled, a support in said chamber for a block of congealed $CO_2$, a motor mounted upon the container, cutting means extending into said chamber and cooperating with a block of $CO_2$ on said support, means connecting said motor to said cutting means, and means for feeding said cutting means toward the block as the block is cut away.

6. In refrigeration apparatus, the combination of a chamber to be cooled, a support in said chamber for a block of congealed $CO_2$, a motor mounted upon the container, cutting means extending into said chamber and cooperating with a block of $CO_2$ on said support, means connecting said motor to said cutting means, means for feeding said cutting means toward the block as the block is cut away, and means for regulating the feeding means.

CASSIUS C. PALMER.